PHASE MODULATION SYSTEM

Filed Jan. 29, 1958 2 Sheets-Sheet 1

INVENTORS:
PAUL R. CROOKER,
RICHARD OCKO,

BY Joseph P. Kates
THEIR ATTORNEY.

INVENTORS:
PAUL R. CROOKER,
RICHARD OCKO,
BY Joseph P. Kates
THEIR ATTORNEY.

United States Patent Office 3,002,160

Patented Sept. 26, 1961

3,002,160
PHASE MODULATION SYSTEM

Paul R. Crooker, East Syracuse, and Richard Ocko, Syracuse, N.Y., assignors to General Electric Company, a corporation of New York Filed Jan. 29, 1958, Ser. No. 712,001
20 Claims. (Cl. 332—29)

The present invention relates to a phase modulation system and more particularly relates to the imposition of phase modulation by means including two distributed or lumped transmission lines whose phase or time delay can be varied by changing one or more of their parameters and wherein the two transmission lines carry signals of different signal frequencies, the desired phase modulated wave being found at the difference frequency.

Prior art devices and methods of creating frequency or phase modulation are concerned with varying oscillator frequency with a variable reactance. Such phase modulators such as that of Van Roberts and Armstrong provide disadvantages because phase deviation is limited to $\pi/2$ radians and thus multiplier systems are required for greater phase deviations. The impedance level using prior art methods is also not optimum for use with transistor circuits. Prior art methods generally provided for phase modulation with one line which caused non-linearity. Examples of such prior art methods are shown in Patent No. 2,650,350 of Heath for "Angular Modulating System," issued August 25, 1953, and Hepp Patent No. 2,565,231, for "Variable Artificial Transmission Line for Effecting Phase Modulated Oscillations," issued August 21, 1951. The Hepp Patent 2,565,231 concerns an Artificial Transmission Line or lumped delay sections wherein inductances can be magnetically biased to vary time delay. The Heath Patent 2,650,350 is assigned to the assignee of the present invention and covers distributed constant line devices, the patent suggesting that such devices might be applied to phase modulation or frequency modulation.

The method and apparatus of the present invention overcomes these and other disadvantages of prior art systems of frequency and phase modulation and in addition provides for the production of an electric wave of varying phase in the production of a phase modulated wave. The methods and apparatus of the present invention may use a distributed or lumped transmission line whose phase or time delay can be varied by changing one or more of its parameters. In addition, the method and apparatus of the present invention provides for production of phase modulation by two transmission lines separated in signal frequencies and wherein the desired phase modulated wave will be found at the difference frequency. Thus, the method and apparatus of the present invention obtains phase modulation in a manner superior to prior art methods because it results in obtaining of more than $\pi/2$ radians phase deviation which provides special application eliminating use of multipliers and the impedance level utilizing the present invention is also more optimum for transistor circuits. Other superior features of the present invention lie in the use of permanent magnets for magnetic core biasing and the use in the signal windings of modulation current where modulation may be obtained by magnetic biasing. Thus, the present invention has much wider application than prior art devices and methods and is especially suitable in carrier current, phase or frequency modulated systems.

Accordingly an object of the present invention is to provide a better method and means for the production of an electric wave of varying phase.

Another aim of the present invention is to provide for the production of a phase modulated wave by means of a distributed or a lumped transmission line whose phase or time delay can be varied by changing one or more of its parameters.

Another purpose of the present invention is to provide a method and apparatus for production of phase modulation by two transmission lines separated in signal frequencies and wherein the desired phase modulated wave will be found at the difference frequency.

Another object of the present invention is to provide a method and an apparatus for obtaining phase modulation which is superior to the present methods of creating frequency or phase modulation by varying oscillator frequency with a variable reactance because by utilizing the present invention more than $\pi/2$ radians phase deviation can be obtained thus permitting elimination of multipliers.

Another object is to provide a method and means for providing phase modulation which will operate in an optimum manner with transistor circuits by virtue of the impedance level usable with the method and apparatus of the present invention.

Another aim of the present invention is to provide an apparatus and a method of phase modulation wherein superior performance will be obtained by the use of permanent magnets for magnetic core biasing.

Another purpose of the present invention is involved in providing a phase modulation system using signal windings for carrying modulation current where modulation is obtained by magnetic biasing.

Another object of the present invention is to provide for maximum linearity in phase modulation in a method and apparatus incorporating use of more than one delay line and wherein compensation for non-linearity may be performed by biasing two transmission lines, applying the modulation to both lines at the same time but in opposite phase and wherein, for example, the transmission line operating at the higher signal frequency may be retarding in phase while the line operating at the lower signal frequency may be advancing in phase or vice versa and wherein when the difference phase frequency is derived from these two signals, a more linear phase response will be obtained.

Another aim of the present invention is to provide a phase modulation system of relative simplicity yet which will insure absolute reliability and linearity in operation and which will be especially suitable for application of transmitters and receivers including carrier current applications.

Another object of the present invention is to provide a method and means for creating phase modulation with greater range of performance and wherein the resulting modulation will be more linear because of the elimination of distortion due to even order harmonics.

Another purpose of the present invention is to provide a phase modulation system which will provide for greater phase modulation because it permits greater deviation from a reference phase.

Another aim of the invention is to provide for greater efficiency and greater applicability to various uses by providing for phase modulation utilizing a delay line.

While the novel and distinctive features of the invention are particularly pointed out in the appended claims, a more expository treatment of the invention, in principle and in detail, together with addional objects and advantages thereof, is afforded by the following description and accompanying drawings in which:

Figure 1:
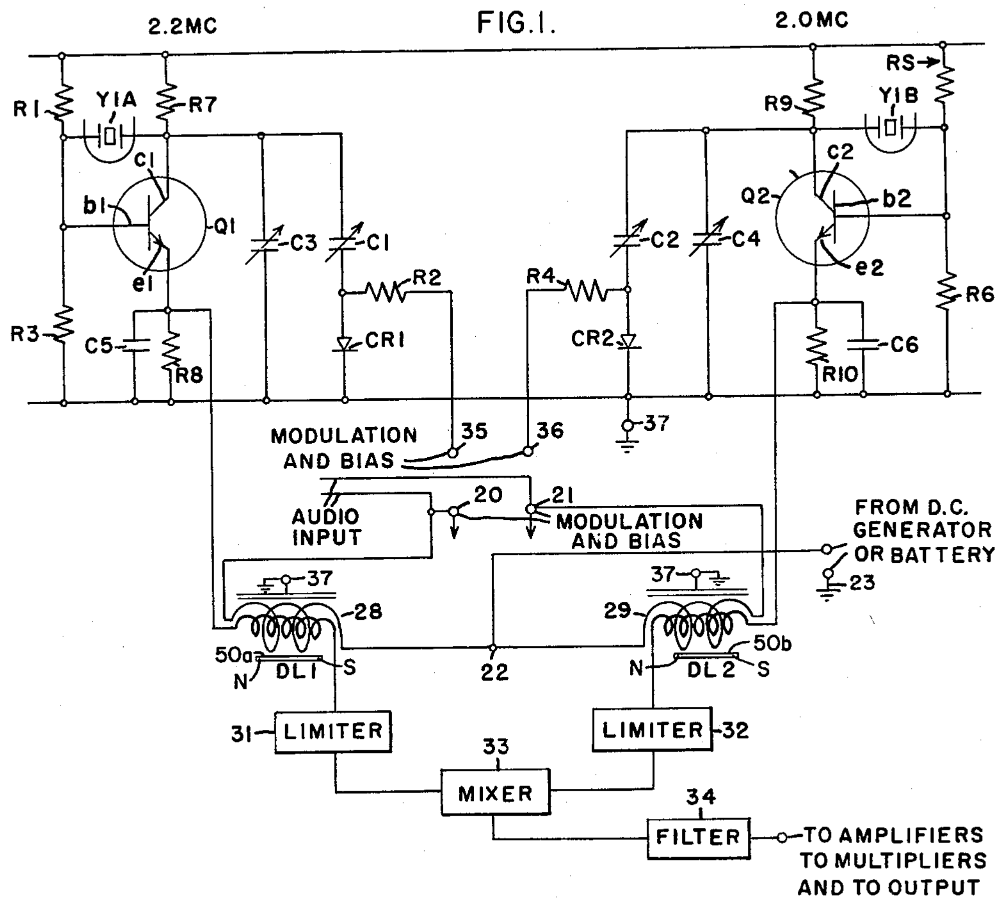
FIG. 1 is a representation partially in schematic and partially in block diagram form illustrating a preferred embodiment of the apparatus of the present invention and serving to facilitate teaching of the inventive method.
Figures 3A, 3B, 4A, 4B, 4C, 4D, 4E:
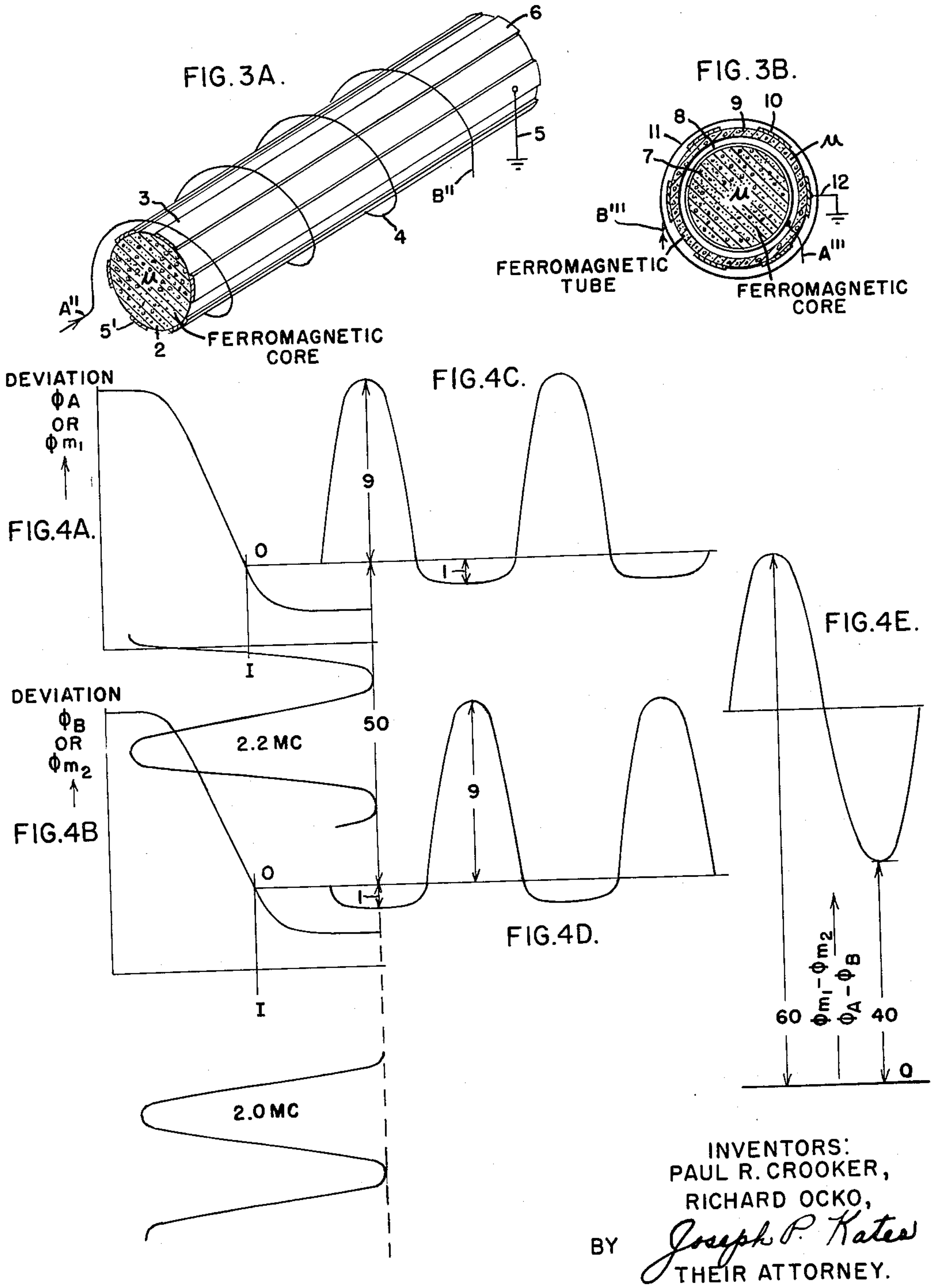
FIG. 3A is an illustration partially pictorially and partially schematically represented of one form of ferromagnetic device which can be utilized as the delay line of the present invention.
FIG. 3B is a partially schematic and partially pictorial representation of a cross-sectional view of another form of delay line which can be utilized with the present invention.

FIG. 4 is a graphical representation combining the graphs of FIGS. 4A and 4B showing modulation current of each winding of the inventive apparatus as the independent variable and phase deviation therefor as the dependent variable and for an exemplary operating point, the phase deviation graphs of FIGS. 4C and 4D, which by subtraction (or addition) give the resultant plot of FIG. 4E, to illustrate features of phase deviation and resulting phase modulation and demonstrate the theory underlying the circuit of FIG. 1.

Referring now to the several figures of the drawing and more particularly to the schematic representation of FIG. 1, one embodiment of the invention is shown wherein it is desired to provide a first radio frequency source and a second radio frequency source and a heterodyne circuit to provide a difference frequency which frequency must be modulated, for example, by audio modulation. When desired to provide modulation of fairly low value radio frequencies, for example, in the neighborhood of 200 kilocycles such modulation can not be readily effected upon a 200 kilocycle carrier wave directly. Accordingly, one method of providing such modulation is to provide a first high frequency oscillator and a second high frequency oscillator and impress modulation upon one or both of these oscillators, mixing the outputs of the two high frequency oscillators in a mixer to thereby provide a modulated difference frequency. One example of provision of such a device is to be found in the carrier current transmitter of the General Electric Company. Such a device is shown in the upper portion of FIG. 1, wherein by way of example a first oscillator which may provide, for example, frequencies in the neighborhood of 2.2 megacycles and a second oscillator which can provide frequencies in the neighborhood of 2 megacycles will be heterodyned to provide an output difference carrier at 200 kilocycles to be transmitted.

In the first oscillator may be provided a transistor stage Q1 which, for example, may be an NPN transistor having an emitter *e*–1, a base *b*–1 and a collector *c*–1. Disposed between the collector *c*–1 and the base *b*–1 of transistor Q1 may be a crystal device Y1*a*. Disposed between a D.-C. voltage source and the collector *c*–1 may be a collector load resistor R7. Disposed between the base *b*–1 and the power source or voltage source may be a bias resistor R1. Disposed between the base *b*–1 of transistor Q1 and ground may be an additional bias resistor R3, resistors R1 and R3 together forming a voltage divider to provide for a correct bias point for the base *b*–1. The voltage divider network of resistors R1 and R3 also serve as load resistors for the crystal device Y1*a*. Disposed between the emitter *e*–1 of transistor Q1 and ground may be a parallel resistor capacitor network comprising an emitter load resistor R8 and capacitor C5. A first tuning capacitor C3 may be disposed between the collector *c*–1 and ground. Capacitor C3 may be utilized as a trimming capacitor for trimming the high frequencies. Disposed across trimming capacitor C3 may be in series a sensitivity adjustment capacitor C1 and a modulation input variable resistance which may be effected by placing, for example, the diode CR1 between capacitor C1 and ground with the cathode of diode CR1 disposed at ground and the anodes of diode CR1 connected to capacitor C1. At the junction between variable capacitor C1 and the anode of crystal diode CR1 may be disposed a decoupling resistor R2 into which will be impressed modulation bias in a manner to be explained hereinafter.

Referring to the upper right-hand portion as shown in the drawing of FIG. 1 a similar circuit is provided in which resistor R9 will correspond to resistor R7 hereinabove-described, resistor R5 will correspond to resistor R1, the crystal Y1*b* will correspond in function to the previously described crystal Y1*a* and the resistor R6 will correspond in function to the previously described resistor R3. Transistor Q2 may be provided to serve a similar function to the transistor device Q1 and may have a base *b*–2, an emitter *e*–2 and a collector *c*–2. In the emitter *e*–2 output circuit, resistor R10 and capacitor C6 will serve the same functions as resistor R8 and capacitor C5 respectively in the circuit of transistor stage Q1. Resistor R4 is provided to decouple modulation bias in a manner similar to resistor R2 and has one end tied to the junction of capacitor C2 and the anode of diode CR2, diode CR2 and capacitor C2 being disposed across capacitor C4 which may have the functions in stage Q2 similar to the functions of diode CR1, capacitor C1 and capacitor C3 respectively in the circuit of transistor Q1.

In operation the method of producing oscillations of high frequency from the circuits of transistors Q1 and Q2 are fairly conventional and will not be described in detail. In the past, however, modulation has been effected of the output of each of the carriers by providing modulation bias at a varying rate in accordance with desired modulation across the crystal diode or other variable impedance device, for example, CR1 as shown in FIG. 1. By changing the voltage applied to the anode of diode CR1, the resistance across that diode and hence the RC constants may be varied at an audio rate to provide for changes in phase and hence changes in frequency of the output carrier from stage Q1 in accordance with the impressed amplitude varied voltage across diode CR1. As shown in the preferred embodiment, modulation bias may also be simultaneously applied to provide for additional intelligence on the carrier output of each of the oscillators Q1 and Q2 if desired, or in the alternative, if desired, a resistance could be placed in the circuits of diodes CR1 and CR2 respectively and only the modulation bias means taught by the invention could be applied.

Figure 2A:
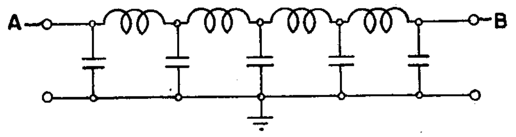
FIG. 2A is a schematic illustration of one form of a lumped delay line which can be utilized with the present invention.
Figure 2B:
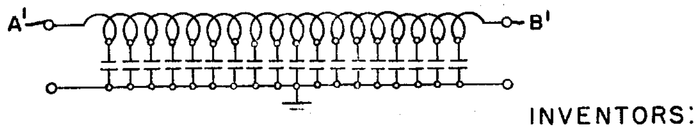
FIG. 2B is a schematic representation of a distributed delay line which can be utilized with the present invention.

In accordance with the present invention, modulation is applied into the emitter of each oscillator stage and developed across output load resistors R8 and R10, respectively utilizing a delay line for each of the modulation inputs to the respective oscillators. Such modulation is caused to be generated as follows:

Referring now more particularly to FIGS. 2A and 2B of the drawings, FIG. 2A shows schematically a lumped constant delay line with sections of inductance in series with the load and sections of capacitance in shunt with the load. FIG. 2B is a schematic representation of a distributed constant delay line where the sections of inductance and capcitance are distributed along the length of the transmission line. These delay lines have the characteristics of delaying the time phase of an impressed voltage. In accordance with well known theory, the time delay per unit length is equal approximately to the square root of the product of the effective inductance and the capacitance per unit length. The total time delay of a section of a delay line is equal to the unit time delay per unit length times the total length. This is equal to the total time delay. Expressed mathematically:

where $T$=delay per unit length
$L_e$=effective inductance per unit length
$C_e$=effective capacitance per unit length then $$T \cong \sqrt{L_e \times C_e}$$

and $$T_T = lT$$

where $T_T$=total delay and $l$=units of length let $F$=frequency of the voltage signal impressed at the input of the delay line then $$\frac{T_T}{F} \times 360° = \phi = \text{total phase change}$$

Although in the preferred embodiment shown in FIG. 1, a distributed delay line has been utilized, a lumped delay line can be used effectively for the purposes of the present invention.

It is possible to create a delay line to perform the function disclosed herein in a number of ways. FIG. 3A shows one method utilizing a core of ferromagnetic material about which as been coated a conductive surface. That is, a rod or core 2 of a saturable ferromagnetic material may be provided which has disposed on the surface thereof a conductive coating material 3. Coating material 3 must be so broken up that conductivity around the circumference of any section of the saturable ferromagnetic material core 2 may not be permitted to occur. One method of so coating would be, for example, to provide parallel coating break lines from one end 5' to a second end 6 of the saturable ferromagnetic rod material. Around the coated core member 2 may be circumferentially a coil or winding 4. The saturable ferromagnetic material may be grounded by connecting the coating at one end therealong to ground as shown at 5.

FIG. 3B shows another embodiment of the distributed delay line in cross-section which was used in a practical operating embodiment of this invention. A core 7 is provided of saturable ferromagnetic material. About core 7 may be disposed a winding or coil 8 which may be used as the signal winding. Surrounding the signal winding may be a tube of saturable ferromagnetic material 9. On the outside surface of tube 9 may be coated or otherwise applied a conducting surface 10. Conducting surface 10 should be circumferentially interrupted in order not to effect the inductance of winding 8 appreciably. In both FIG. 3A and 3B the impressed voltage is placed between terminals A'' or A''', and the ground connection 5 or 12 respectively. Ground connection 5 or 12 will ground the conducting surfaces 6 and 10, respectively. Wound about the outer surface of the device of FIG. 3B may be a modulation and bias winding 11.

It should be understood of course that the outer core 9 may be a fixed core as shown or may be comprised of a dielectric material or may be provided with means such that the dielectric constant of the outer core material may also be variable. In this manner not only the inductance of the delay line may be varied by varying the mu ($\mu$ or permeability) which will vary the inductance of the material in a manner which will be described but simultaneously the capacitance of the delay line may be varied by varying the capacitance introduced by core member 9. It may be noted that capacitance will occur between coil 11 and the outside surface of core 9. Coil 11 may carry the audio plus bias.

It has been shown that the absolute phase is related to the total time delay and that the total time delay is related to the capacity per unit length and to the effective inductance per unit length. It is generally known that the inductance of a winding is related to the permeability of its core material and that varying the permeability will vary the inductance and hence vary the phase in accordance with the formula:

$$L_e = f(\mu)$$

wherein the inductance is directly proportional to permeability of the core around which a coil may be wound. Hence, it may readily be seen that if the inductance of one of the devices shown, for example, in FIG. 3A and FIG. 3B which are in reality delay lines similar to the devices of FIG. 2A and FIG. 2B can be varied, therefore if these devices are utilized as the modulation devices DL1 and DL2, respectively, shown in FIG. 1 of the drawings then in accordance therewith, the phase output of these signal windings will be varied and will impress a varying phase modulation voltage across the resistors R8 and R10 respectively.

Referring more particularly now to FIG. 4 of the drawings wherein is shown the graphs denoting operating superiority of the device of the present invention, FIGS. 4A and 4B contain a typical graph of phase deviation vs. modulation current at exemplary operating points. It can be seen that there is a non-linear relationship between phase deviation and modulating current. When the magnetic bias is established at or near point zero in FIG. 4A or 4B by means of direct current in the modulation winding or by the application of a permanent magnetic bias, a phase modulation will result with the introduction of modulating sine wave current. It will be noticed that this resulting phase modulation is distorted, as shown in FIG. 4C and FIG. 4D. This distortion is evident when using a single delay line as a phase modulator. In FIG. 1 phase modulation is created in delay line DL1 and delay line DL2 in accordance with the principles of this invention. The resulting modulation in each winding is shown in FIG. 4C and FIG. 4D. However, when the windings are connected as in FIG. 1, the resulting modulation shown in FIG. 4C and FIG. 4D can be combined to produce a more linear modulation at the difference frequency as shown in FIG. 4E. It should be understood that the windings are connected in a configuration which in this application is called "push-pull" and which provides this more linear modulation. The bias current is provided from a center tap between the two modulating windings which current runs from this center tap equally between the two modulating windings. The connections for the D.-C. input are between terminals 22 and 23. At the same time the audio current for both delay lines is applied between terminals 20 and 21. Because of the connection as shown in FIG. 1 in "push-pull" of the windings, respectively labeled DL1 and DL2, not only is an unlimited amount of phase modulation swing possible, but, in addition, the non-linearity effect caused by the even harmonics and particularly caused by the second harmonic may be eliminated so that linear modulation of the output of respective oscillators Q1 and Q2 may be effected. This may be mathematically proved as follows to show that even harmonic reduction occurs with phase modulation with the push-pull method of modulation taught in the present invention. For example, let $e_1$ equal the modulation output of delay line DL1 and $e_2$ equal the modulation output of delay line DL2. A may be an arbitrary amplitude of the output modulation, $\omega_1$ may be the radio frequency of oscillator Q1 in radians per second and $\omega_2$ may be the frequency of oscillator Q2 in radians per second, $t$=elapsed time, $\phi_{m1}$ will be the phase at any instant of the phase output modulation wave and $\phi_{m2}$ will be the modulation at the same instant of the output phase modulation of the winding of delay line DL2.

(1) $$e_1=A\sin(\omega_1 t+\phi_{m1})$$

(2) $$e_2=A\sin(\omega_2 t+\phi_{m2})$$

where $\phi_m=0$ $e_1=A\sin\omega_1 t$ $e_2=A\sin\omega_2 t$ taking the product (3) $$e_1e_2=2A^2\sin[(\omega_1+\omega_2)t+\sin(\omega_1-\omega_2)t]$$

if $$\phi_m\neq 0$$

(4) $$e_1e_2=2A^2[\sin\{(\omega_1+\omega_2)t+\phi_{m1}+\phi_{m2}\}+\sin\{(\omega_1-\omega_2)t+\phi_{m1}-\phi_{m2}\}$$

let (5) $$\phi_{m1}=a_0+a_1i+a_2i^2+a_3i^3+\ldots+a_ni^n$$

(6) $$\phi_{m2}=a_0-a_1i+a_2i^2-a_3i^3+\ldots(-1)a_ni^n$$

(7) $$\Delta\phi=(\omega_1-\omega_2)t+2a_1i+2a_3i^3 \text{ etc.}$$

From the foregoing equations it may readily be seen that in the "push-pull" relationship used, Equation 6 will be added to Equation 5 and as shown in the solution of Equation 7 the phase deviation will then at any time include the fundamental frequency and only the odd harmonics since the even harmonics will be dropped out in adding Equation 6 and Equation 5. Thereby, there is provided not only a greater permissible amount of frequency or phase deviation but in addition the non-linear distortion caused by the even harmonics are substantially eliminated. In addition, it will be understood that not only is linear modulation with greater deviation effected but because of the use of "push-pull" we get greater efficiency from the audio driving source and thereby energy from the audio driving source is utilized to its fullest extent. It should be understood that in the modulation applied, for example, utilizing the devices of FIGS. 3A or 3B that modulation has been impressed upon the modulation winding, for example, on the device of FIG. 3B. However, in both cases the modulation could readily be impressed into the signal winding. Thus, if the signal winding is utilized to introduce the two megacycles and the 2.2 megacycles into the mixer this same winding may in each case have impressed thereacross the modulation signals to thereby effect elimination of this part and the attendant expense of the modulation winding. For example, the inner or signal windings 28 and 29, respectively could have by transformer coupling or other means known to the art, modulation input impressed thereon instead of impressing this by means of the special modulation winding shown. It should also be understood that instead of a direct current bias being applied across terminals 22 and 23, respectively, permanent magnetic biasing means which may suitably be a permanent magnetic such as magnets 50*a* and 50*b* respectively or temporary magnetic means may be impressed across these two terminals to determine the flux operating point at which the modulation windings DL1 and DL2 are to be operated. In this manner, not only would necessity for a D.-C. source be eliminated but in addition a more stable operating point can be effected. Also, no necessity would exist for regulation or for insuring testing at intervals of a battery or other D.-C. source to insure exactly constant output over a period of time. Permanent magnets 50*a* and 50*b*, of course, can be supported by suitable means well known in the art such as brackets, etc. (not shown).

The signal output of windings DL1 and DL2 may be connected to amplitude limiters 31 and 32 before being impressed upon mixer 33. The function of limiters 31 and 32 is to remove any incidental amplitude modulation which may have resulted from the phase modulation action in windings DL1 and DL2. The signal output of limiters 31 and 32 may be impressed upon a mixer 33 which may be any one of a variety of mixers known to the art. Appearing at the input of mixer 33 will be the phase modulated output at the signal frequency of oscillators Q1 and Q2, which will contain the modulation impressed not only by the delay lines DL1 and DL2 but the modulation provided between terminals 35 and 36 to terminal 37. In this particular embodiment a filter 34 was provided to eliminate from the output all products of modulation and mixing at frequencies other than the difference frequency of stages Q1 and Q2, plus the desired modulation. It will be understood that further amplifiers and multipliers may be provided after the filter or the mixer to raise the frequency or power lever of the phase modulated signal. It may also be understood that there is an inherent relationship between phase modulation and frequency modulation and that by proper application of circuits known to the art, desirable frequency modulation characteristics will be produced by this phase modulator.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A phase modulation system comprising a first oscillator to generate a first carrier frequency wave, a second oscillator to generate a second carrier frequency wave, a first and a second transmission delay line whose time delay can be varied to vary phase by changing one or more of its parameters, means to impress a first modulation signal on said first transmission line, means to impress a second modulation signal on said second transmission line, means to modulate said carrier waves with respective transmission lines outputs and means to provide a difference frequency between the output of said first and said second transmission lines modulated carrier waves said output being a required phase modulated wave.

2. Means to provide for the production of an electric wave of varying phase constituting a phase modulated wave comprising means to produce a first and a second carrier wave, a first and a second transmission line, means for changing the parameters of each of said transmission lines, means for impressing a first frequency signal upon one of said lines and for impressing a second frequency signal upon the other of said lines, to provide a desired phase modulated wave at the difference frequency to provide more than $\pi/2$ radians phase deviation.

3. The apparatus of claim 2 wherein each of said distributed lines includes a magnetic core, and includes a permanent magnet to provide magnetic core biasing, said transmission lines including signal windings to carry modulating current, said modulation being obtained by said magnetic biasing.

4. Means to provide phase modulation for a carrier wave, said means comprising a first and a second transmission line, means for changing the parameters of said first transmission line to provide for phase delay, means for changing the parameters of said second transmission line to provide for phase delay, said transmission lines being separated in signal frequencies, and means to heterodyne the output of said transmission lines to thereby provide said phase modulated carrier wave.

5. The apparatus of claim 4 wherein each of said transmission lines includes a magnetic core, and wherein is included a permanet magnet for each of said magnetic cores to provide for magnetic core biasing.

6. Apparatus for providing for a phase modulated carrier wave output, said apparatus comprising a first delay line, a second delay line, each of said delay lines having the characteristics of delaying the time phase of an impressed voltage and responsive to a control signal to vary said time phase with a characteristic exhibiting a saturation region, means to impress modulation as phase opposed control signals upon each of said delay lines, means to provide a first radio frequency signal of relatively high frequency, means to provide a second radio frequency of relatively high frequency but lower than the first frequency by the frequency of an output carrier wave desired, said delay lines respectively impressing phase modulation upon said first and said second radio frequency carrier waves and being operated in push-pull relationship relative to said saturation region, means to heterodyne the first modulated wave and the second modulated wave to provide a difference frequency carrier wave phase modulated by said delay lines.

7. The apparatus of claim 6 wherein each of said delay lines is a lumped delay line comprising a core of ferromagnetic material, a conductive surface coating on said core, said coating being formed to interrupt conductivity around the circumference of any section of the ferromagnetic material core, and a coil disposed around said coated core member, said ferromagnetic material being grounded.

8. The apparatus of claim 6 wherein said delay lines each comprises a core of saturable ferromagnetic material, a winding circumferentially disposed about said core, said winding comprising a carrier signal winding, a tube forming an outer core surrounding said signal winding, the outside surface of said tube being coated with an interrupted conducting surface so as not to affect the inductance of said signal winding, one end of said signal winding having a terminal connected thereto, impressed carrier voltages being placed between said terminal and ground, and a modulation bias winding disposed circumferentially around and wound about the outer surface of said conducting surface and insulated therefrom.

9. The apparatus of claim 8, said outer core being a fixed core of ferromagnetic material.

10. The apparatus of claim 8, said outer core being comprised of a dielectric material.

11. The apparatus of claim 10 with means to vary the dielectric constant of the outer core material, so that the inductance of the delay line may be varied by varying the permeability of said ferroelectric material and simultaneously the capacitance of the delay line may be varied by varying the dielectric constant of the outer core member.

12. A system of phase modulation, said system comprising a first and a second delay line, means for varying the inductance of at least one of said delay lines, said delay lines being modulation devices to impress a modulation wave upon a carrier, means for varying the phase output of the delay lines to provide for an impressed varying phase modulation voltage, means for providing a first radio frequency wave, means for providing a second radio frequency wave of a frequency lower than said first radio frequency wave, said delay lines impressing said varying phase modulation voltage across each of said radio frequency wave means, means for providing a magnetic bias of each of said delay lines at approximately point zero, said last-named means comprising means for supplying a permanent magnetic bias to each of said delay lines, means for introducing a modulating sine wave current to thereby permit phase modulation of said sine wave current by said permanent magnetic bias, means for connecting said delay lines in push-pull relationship to provide linear modulation output, said delay means including a first and a second modulating winding and a center tap connected therebetween such that current can run from this center tap equally between the two modulating windings, terminal means to provide a D.-C. input to said modulating windings, and terminal means to apply an audio current for both delay lines, the push-pull connection of the windings thereby providing an unlimited amount of phase modulation swing and providing for linear effect because of elimination of even harmonics.

13. The apparatus of claim 12, said means of providing bias to the modulating windings including a means to apply a direct current to the modulating windings.

14. Means to provide a phase modulated output on a wave of relatively intermediate carrier frequency, said means comprising means for generating a first high frequency carrier wave, means for generating a second high frequency carrier wave, the difference frequency between said first carrier wave and said second carrier wave being said intermediate frequency, means for impressing phase modulation upon said first high frequency carrier wave, means for impressing phase modulation upon said second high frequency carrier wave, said impressing means comprising a first delay line and a second delay line each responsive to a control signal to vary the time delay with a characteristic exhibiting a saturation region, means for operating said delay lines in push-pull relationship, whereby they may be additively combined to form linear undistorted phase modulation of relatively large swing, said last means including means to impress an audio signal as push-pull control signals for said first and said second delay lines, and means to bias said delay lines for said control signals to operate about a point near saturation region.

15. The apparatus of claim 14 wherein said bias means is magnetic biasing means comprising a permanent magnet and including a mixer to heterodyne said first carrier modulated radio high frequency carrier wave and said second modulated high frequency carrier wave to thereby provide a modulated carrier wave at the difference frequency which will be phase modulated with a swing including an amount greater than $\pi/2$ radians.

16. An angular modulation system comprising means for generating a first high frequency wave, means for generating a second high frequency wave differing by a predetermined frequency from said first wave, a pair of transmission lines each having a signal controlled transmission delay function characterized by a proportional range and a saturated range with a non-linear transition region therebetween, control means for applying delay control signals to each said transmission line, input and output connections for said transmission lines, means for coupling said first and second waves to the respective input connections of said transmission lines, means for establishing a quiescent operating point for each of said transmission lines near said transition region, means for applying phase-opposed modulation signals to said control means respectively, means coupled to said output connections for deriving the difference frequency spectrum of said first and second waves after passing through said transmission lines respectively, and utilization means responsive to said difference frequency spectrum.

17. An angular modulation system comprising means for generating a first high frequency wave, means for generating a second high frequency wave differing by a predetermined frequency from said first wave, a pair of transmission lines each having a saturable ferromagnetic material associated therewith for varying the time delay for transmission of signals through said lines in accordance with the permeability of said material, modulation windings for each of said lines for applying magnetic force to said material in accordance with currents in said modulation windings, means providing magnetic biasing of said material to obtain a static operating point near the saturation region for each of said lines, means for coupling phase opposed modulation signals to said modulation windings to produce magnetic forces which are alternately additive and subtractive respectively relative to said magnetic biasing, input and output connections for said transmission lines, means for coupling said first and second waves to the respective input connections of said transmission lines, means coupled to said output connections for deriving the difference frequency spectrum of said first and second waves after passing through said transmission lines respectively, and utilization means responsive to said difference frequency spectrum.

18. Apparatus according to claim 17 in which said magnetic biasing results from a direct current component flowing through said modulation windings.

19. Apparatus according to claim 17 in which said magnetic biasing is obtained from permanent magnet means magnetically coupled to said material.

20. An angular modulation system comprising means for generating a first high frequency wave means for generating a second high frequency wave differing by a predetermined frequency from said first wave, signal controlled variable impedance means coupled to each of the wave generating means for angle modulating the waves generated thereby, means for applying first modulation signals to said variable impedance means, a pair of transmission lines each having a signal controlled delay characteristic, control means for applying delay control signals to each of said transmission line, input and output connections for said transmission lines, means for coupling first and second waves to the respective input connections of said transmission lines, means for applying phase-opposed second modulation signals to said control means respectively, means coupled to said output connections for deriving the difference frequency spectrum of said first and second waves after passing through said transmission lines respectively and utilization means responsive to said difference frequency spectrum.

References Cited in the file of this patent

UNITED STATES PATENTS

| | | |
|---|---|---|
| 2,258,261 | Roosenstein | Oct. 7, 1941 |
| 2,526,347 | Golladay | Oct. 17, 1950 |
| 2,569,309 | Hepp | Sept. 25, 1951 |
| 2,650,350 | Heath | Aug. 25, 1953 |
| 2,703,391 | Gunderson | Mar. 1, 1955 |
| 2,735,983 | McLeod | Feb. 21, 1956 |
| 2,852,606 | Curry | Sept. 16, 1958 |
| 2,882,392 | Sands | Apr. 14, 1959 |